United States Patent
Nakano

(10) Patent No.: US 9,703,134 B2
(45) Date of Patent: Jul. 11, 2017

(54) LIQUID CRYSTAL DISPLAY DEVICE EQUIPPED WITH BUILT-IN TOUCH PANEL HAVING A NARROW FLEXIBLE WIRING SUBSTRATE

(71) Applicant: Japan Display Inc., Tokyo (JP)

(72) Inventor: Yasushi Nakano, Tokyo (JP)

(73) Assignee: Japan Dispaly Inc., Tokyo (JP)

( * ) Notice: Subject to any disclaimer, the term of this patent is extended or adjusted under 35 U.S.C. 154(b) by 598 days.

(21) Appl. No.: 14/147,710

(22) Filed: Jan. 6, 2014

(65) Prior Publication Data
US 2014/0192274 A1    Jul. 10, 2014

(30) Foreign Application Priority Data

Jan. 10, 2013    (JP) .................................. 2013-002465

(51) Int. Cl.
*G02F 1/1333*    (2006.01)
*G02F 1/1345*    (2006.01)
(Continued)

(52) U.S. Cl.
CPC ...... *G02F 1/13338* (2013.01); *G02F 1/13452* (2013.01); *G06F 3/044* (2013.01); *G06F 3/0412* (2013.01)

(58) Field of Classification Search
CPC ............. G02F 1/13338; G02F 1/13452; G06F 3/0412; G06F 3/044
See application file for complete search history.

(56) References Cited

U.S. PATENT DOCUMENTS

2005/0099402 A1*  5/2005  Nakanishi ............. G06F 3/0412
                                                              345/173
2005/0233611 A1*  10/2005 Sung ................... G02F 1/13452
                                                              439/67
(Continued)

FOREIGN PATENT DOCUMENTS

JP    H09-146110 A    6/1997
JP    2003-149665 A   5/2003
(Continued)

OTHER PUBLICATIONS

Japanese Office Action mailed on Dec. 6, 2016, for corresponding Japanese Patent Application No. 2013-002465.

*Primary Examiner* — Lun-Yi Lao
*Assistant Examiner* — Kelly Hegarty
(74) *Attorney, Agent, or Firm* — Typha IP LLC

(57) ABSTRACT

A liquid crystal display device equipped with a built-in touch panel includes a second substrate on which a wiring pattern for configuring a touch panel is formed, and a flexible wiring substrate joined to the second substrate with an overlap portion, and electrically connected to the wiring pattern. The flexible wiring substrate is formed of a multi-layer substrate having a first conductive pattern layer having a plurality of terminal portions electrically connected onto the wiring pattern, a second conductive pattern layer, an insulating layer interposed between the first conductive pattern layer and the second conductive pattern layer, and a plurality of contact portions that penetrates through the insulating layer, and electrically connects the plurality of terminal portions to the second conductive pattern layer. The plurality of contact portions is arranged to overlap with the plurality of terminal portions.

21 Claims, 10 Drawing Sheets

(51) Int. Cl.
*G06F 3/041* (2006.01)
*G06F 3/044* (2006.01)

(56) References Cited

U.S. PATENT DOCUMENTS

| | | | |
|---|---|---|---|
| 2006/0065437 A1* | 3/2006 | Yumoto | G02F 1/13452 174/260 |
| 2008/0180585 A1* | 7/2008 | Kubota | G06F 3/045 349/12 |
| 2009/0115743 A1 | 5/2009 | Oowaki | |
| 2009/0207367 A1* | 8/2009 | Oohira | H05K 1/0219 349/150 |
| 2010/0283762 A1 | 11/2010 | Takusa | |
| 2010/0295800 A1 | 11/2010 | Kuo | |

FOREIGN PATENT DOCUMENTS

| | | |
|---|---|---|
| JP | 2009-116090 | 5/2009 |
| JP | 2010-175782 A | 8/2010 |

* cited by examiner

LIQUID CRYSTAL DISPLAY DEVICE EQUIPPED WITH BUILT-IN TOUCH PANEL HAVING A NARROW FLEXIBLE WIRING SUBSTRATE

CROSS-REFERENCE TO RELATED APPLICATION

The present application claims priority from Japanese application JP2013-2465 filed on Jan. 10, 2013, the content of which is hereby incorporated by reference into this application.

BACKGROUND OF THE INVENTION

1. Field of the Invention

The present invention relates to a liquid crystal display device equipped with a built-in touch panel.

2. Description of the Related Art

Most of liquid crystal display devices equipped with a touch panel is of an external type in which a liquid crystal display panel and a touch panel are put on each other, which are disclosed in, for example, JP 2009-116090 A, and corresponding U.S. Pat. No. 8,194,048. The touch panel and the liquid crystal display panel are electrically connected to the external by a flexible wiring substrate.

When the touch panel is another part different from the liquid crystal display panel, it is difficult to thin the overall device. Therefore, a device of the type in which the touch panel is incorporated into the liquid crystal display panel has been developed. In the liquid crystal display device equipped with a built-in touch panel of this type, a substrate on an upper side of the liquid crystal display panel is also shared with the touch panel, and joined to the flexible wiring substrate for electric connection with the touch panel. An end of a substrate on a lower side of the liquid crystal display panel is covered with the flexible wiring substrate. The end of the lower substrate is equipped with a terminal for electric connection of the liquid crystal display panel to the external, and the terminal is covered with the flexible wiring substrate. For that reason, for example, there arises such a problem that a process for providing a resin that protects an integrated circuit mounted on the liquid crystal display panel cannot be conducted. The related art flexible wiring substrate needs a wide width for the purpose of forming a large number of lines, and the amount of flexible wiring substrate protruded from the upper substrate shared with the touch panel becomes large, which causes the above problem.

SUMMARY OF THE INVENTION

The present invention aims at narrowing a width of a flexible wiring substrate.

(1) According to the present invention, there is provided a liquid crystal display device equipped with a built-in touch panel, including: a first substrate on which a circuit layer for driving a liquid crystal material is formed; a second substrate on which a wiring pattern for configuring a touch panel is formed; and a flexible wiring substrate joined to have a portion overlapped with the second substrate, and electrically connected to the wiring pattern, in which the flexible wiring substrate is formed of a multilayer substrate having a first conductive pattern layer having a plurality of terminal portions electrically connected onto the wiring pattern, a second conductive pattern layer, an insulating layer interposed between the first conductive pattern layer and the second conductive pattern layer, and a plurality of contact portions that penetrates through the insulating layer, and electrically connects the plurality of terminal portions to the second conductive pattern layer, and in which the plurality of contact portions is arranged to overlap with the plurality of terminal portions. According to the present invention, since the plurality of contact portions overlaps with the plurality of terminal portions, the width of the flexible wiring substrate can be narrowed.

(2) There is provided the liquid crystal display device equipped with a built-in touch panel according to the item (1), in which the flexible wiring substrate includes an overlap portion overlapped with the second substrate, and a leading portion led from at least one of both ends of the overlap portion in a length direction of the overlap portion with the avoidance of an intermediate portion thereof to intersect with the length direction, in which the overlap portion overlaps with an end placed on one side of the second substrate in a longitudinal direction, and extended in a lateral direction, and in which the length direction of the overlap portion and the lateral direction of the second substrate match each other.

(3) There is provided the liquid crystal display device equipped with a built-in touch panel according to the item (2), in which the leading portion is led from one of the both ends of the overlap portion in the length direction thereof.

(4) There is provided the liquid crystal display device equipped with a built-in touch panel according to the item (2), in which the leading portion is led from each of the both ends of the overlap portion in the length direction, and in which the flexible wiring substrate further includes a coupling portion that couples the leading portions led from the both ends of the overlap portion with being spaced from the overlap portion, and a space is formed between the overlap portion and the coupling portion.

(5) There is provided the liquid crystal display device equipped with a built-in touch panel according to any one of the items (2) to (4), in which the plurality of terminal portions is formed of the terminal portions of a plurality of groups each having two or more adjacent terminal portions, and in which the first conductive pattern layer has a connection portion that electrically connects the two or more adjacent terminal portions configuring each of the groups to each other.

(6) There is provided the liquid crystal display device equipped with a built-in touch panel according to the item (5), in which the first conductive pattern layer includes a dummy terminal that does not establish electrical continuity with the connection portion between the terminal portions of the adjacent groups.

(7) There is provided the liquid crystal display device equipped with a built-in touch panel according to the item (5) or (6), in which the plurality of terminal portions is each shaped to extend in a width direction orthogonal to the length of the overlap portion, in which the connection portion is shaped to extend in the length direction of the overlap portion, and in which the adjacent two or more terminal portions configuring each of the groups, and the connection portion are shaped to intersect with each other with shared intersection portions.

(8) There is provided the liquid crystal display device equipped with a built-in touch panel according to the item (7), in which the connection portion is located in the center of the overlap portion in the width direction.

(9) There is provided the liquid crystal display device equipped with a built-in touch panel according to the item (7), in which a plurality of the connection portions electrically connected to the respective terminal portions of the plurality of groups is displaced from one side to the other side of the overlap portion in the width direction in an arrangement sequence of the terminal portions of the plurality of groups.

(10) There is provided the liquid crystal display device equipped with a built-in touch panel according to the item (9), in which all of the plurality of connection portions electrically connected to the respective terminal portions of the plurality of groups are displaced to any side from a center of the overlap portion in the width direction.

(11) There is provided the liquid crystal display device equipped with a built-in touch panel according to any one of the items (7) to (10), in which two or more adjacent terminal portions configuring each of the groups have a land portion at an intersection point between one of the terminal portions and the connection portion, and are electrically connected to the second conductive pattern layer by one of the contact portions disposed on the land portion.

(12) There is provided the liquid crystal display device equipped with a built-in touch panel according to the item (11), in which the terminal portions of each of the groups include three or more of the terminal portions, and in which the land portion is disposed on the terminal portion located at a position other than both ends of the three or more terminal portions in an arrangement direction.

(13) There is provided the liquid crystal display device equipped with a built-in touch panel according to the item (11), in which the terminal portions of each of the groups include three or more of the terminal portions, and in which the land portion is disposed on the terminal portion located at any one of both ends of the three or more terminal portions in an arrangement direction.

(14) There is provided the liquid crystal display device equipped with a built-in touch panel according to any one of the items (5) to (13), in which an outer diameter of the respective contact portions is larger than widths of the terminal portions and the connection portion.

(15) There is provided the liquid crystal display device equipped with a built-in touch panel according to any one of the items (2) to (14), in which the overlap portion of the flexible wiring substrate includes a crimped portion joined to the second substrate by crimping, and an uncrimped portion overlapped with the second substrate with the avoidance of crimping, and in which the plurality of contact portions are arranged in the uncrimped portion.

(16) There is provided the liquid crystal display device equipped with a built-in touch panel according to the item (15), in which the end of the second substrate joined to the flexible wiring substrate includes an outward portion of a leading end side in the longitudinal direction, and an inward portion on a center side of the second substrate from the leading end, in which the crimped portion is joined to the outward portion, and in which the uncrimped portion is overlapped with the inward portion.

(17) There is provided the liquid crystal display device equipped with a built-in touch panel according to any one of the items (2) to (16), in which the first conductive pattern layer includes a plurality of first wires separated from the plurality of terminal portions and arranged in the leading portion, in which the second conductive pattern layer includes a plurality of second wires electrically connected to the plurality of contact portions, respectively, and in which the plurality of second wires of the second conductive pattern layer passes through the overlap portion of the flexible wiring substrate, and is electrically connected to the plurality of first wires of the first conductive pattern layer on the leading portion.

(18) There is provided the liquid crystal display device equipped with a built-in touch panel according to the item (17), in which the plurality of second wires includes a wire that passes through a side end at which the leading portion is led from the plurality of contact portions, and a wire that passes through a side end opposite to the side at which the leading portion is led in the overlap portion.

(19) There is provided the liquid crystal display device equipped with a built-in touch panel according to the item (17), in which the plurality of second wires passes through a side end opposite to a side at which the leading portion is led with the avoidance of the side at which the leading portion is led from the plurality of contact portions in the overlap portion.

(20) There is provided the liquid crystal display device equipped with a built-in touch panel according to any one of the items (17) to (19), in which the second conductive pattern layer has a planar pattern formed to avoid a contact with the plurality of second wires.

(21) There is provided the liquid crystal display device equipped with a built-in touch panel according to the item (16), in which the second conductive pattern layer has a planar pattern formed to avoid a contact with the plurality of second wires, and in which the planar pattern is formed to overlap with the crimped portion with the avoidance of overlapping with the uncrimped portion.

(22) There is provided the liquid crystal display device equipped with a built-in touch panel according to any one of the items (5) to (14), in which the wiring pattern of the second substrate has a plurality of terminals, and in which the adjacent two or more terminal portions configuring each of the groups electrically connected by the connection portion are electrically connected to one of the terminals of the wiring pattern of the second substrate.

(23) There is provided the liquid crystal display device equipped with a built-in touch panel according to any one of the items (2) to (22), in which the first substrate is arranged to have a projecting portion projected from the second substrate, and in which the projecting portion of the first substrate is projected from the end of the second substrate which overlaps with the overlap portion of the flexible wiring substrate.

(24) There is provided the liquid crystal display device equipped with a built-in touch panel according to the item (23), in which the leading portion of the flexible wiring substrate is led to avoid an overlap with a part of the projecting portion of the first substrate.

(25) There is provided the liquid crystal display device equipped with a built-in touch panel according to the item (24), further including: an integrated circuit chip mounted in an area of the projecting portion of the first substrate which does not overlap with the leading portion of the flexible wiring substrate; and a resin disposed to come in contact with an outer periphery of the integrated circuit chip.

DETAILED DESCRIPTION OF THE INVENTION

Hereinafter, embodiments of the present invention will be described with reference to the accompanying drawings.

Figure 1:
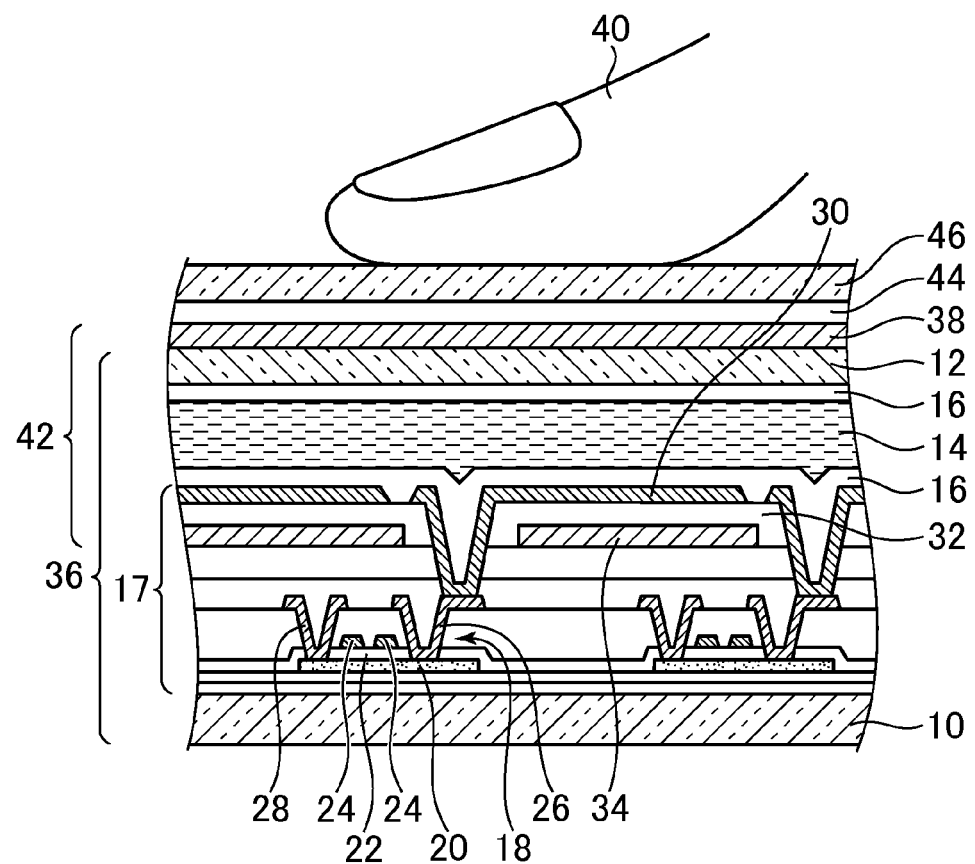
FIG. 1 is a cross-sectional view of a liquid crystal display device equipped with a built-in touch panel according to an embodiment of the present invention.
Figure 2:
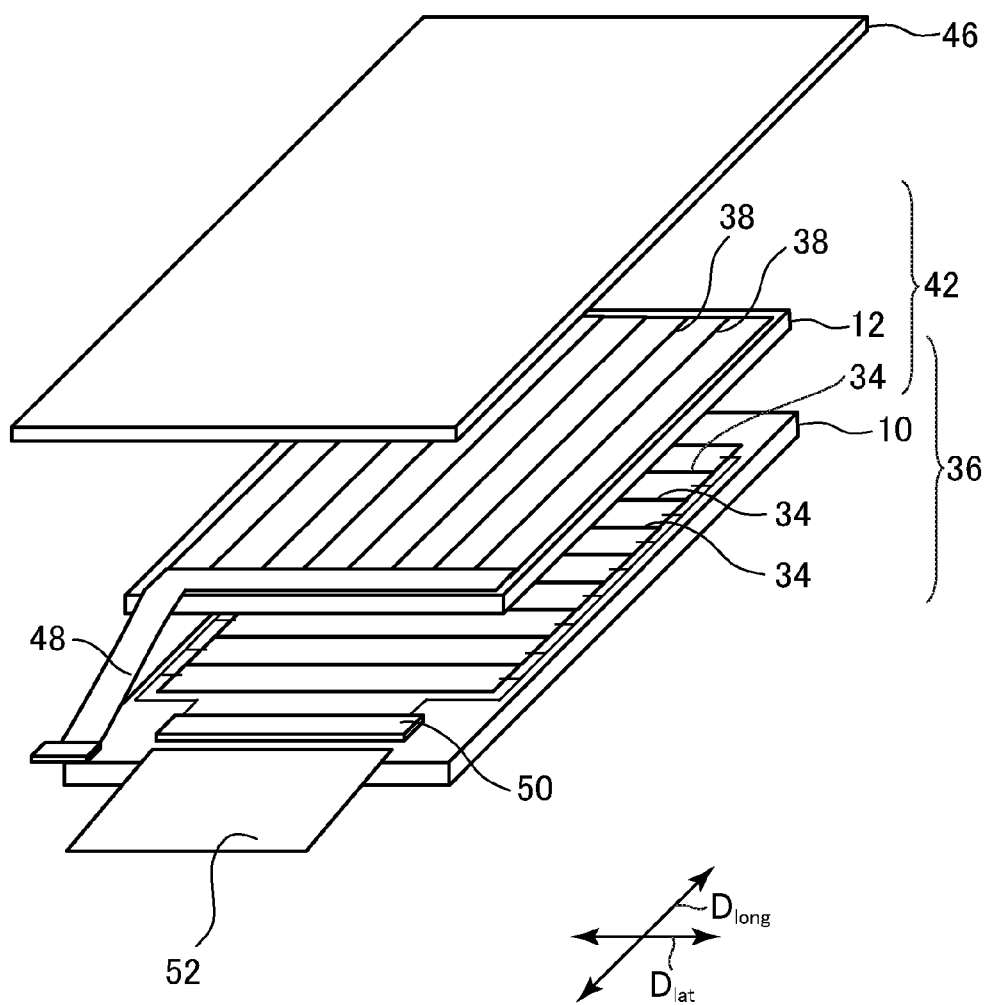
FIG. 2 is an exploded perspective view of a main portion of the liquid crystal display device equipped with a built-in touch panel according to the embodiment of the present invention.

FIG. 1 is a cross-sectional view of a liquid crystal display device equipped with a built-in touch panel according to an embodiment of the present invention. FIG. 2 is an exploded perspective view of a main portion of the liquid crystal display device equipped with a built-in touch panel according to the embodiment of the present invention.

The liquid crystal display device equipped with a built-in touch panel includes a first substrate 10 and a second substrate 12. As illustrated in FIG. 1, a liquid crystal material 14 is arranged between the first substrate 10 and the second substrate 12. Two oriented films 16 are formed between the first substrate 10 and the second substrate 12 to sandwich the liquid crystal material 14 therebetween.

The second substrate 12 is made of a light transmissive material (for example, glass). The second substrate 12 is formed of a color filter substrate, and formed with a colored layer and a black matrix not shown. The oriented film 16 is formed on the second substrate 12. The oriented film 16 is formed on the colored layer and the black matrix not shown.

The first substrate 10 is made of a light transmissive material (for example, glass). A circuit layer 17 is formed on the first substrate 10. A circuit layer 17 includes a thin film transistor 18. The first substrate 10 is also called "TFT (thin film transistor) substrate" because the thin film transistor 18 is formed thereon. The thin film transistor 18 includes a semiconductor film 20 made of polysilicon, a gate insulating film 22 that covers the semiconductor film 20, gate electrodes 24 that are arranged above the semiconductor film 20 through the gate insulating film 22, and a source electrode 26 and a drain electrode 28 which penetrate through the gate insulating film 22, and are electrically connected to the semiconductor film 20.

One of the source electrode 26 and the drain electrode 28 is electrically connected to a pixel electrode 30. Also, a common electrode 34 is formed at a layer position different from that of the pixel electrode 30 through an insulating film 32. In an example of FIG. 1, the pixel electrode 30 is located above the common electrode 34 (a side distant from the first substrate 10). Those electrodes may be arranged upside down. The pixel electrode 30 and the common electrode 34 also configure a part of the circuit layer 17.

A liquid crystal display panel 36 is configured to include the above components. An image is displayed under the control of a light using an electric field developed between a plurality of the pixel electrodes 30 and a plurality of the common electrodes 34. In this embodiment, the liquid crystal material 14 is driven by the electric field formed between the pixel electrodes 30 and the common electrodes 34. Since the pixel electrodes 30 and the common electrodes 34 are formed on the first substrate 10, an electric field formed between the pixel electrodes 30 and the common electrodes 34 is a horizontal electric field. Alternatively, the pixel electrodes 30 may be formed on the first substrate 10, the common electrodes 34 may be formed on the second substrate 12, and the liquid crystal material 14 may be driven by a vertical electric field. Even in any configurations, the pixel electrodes 30 and the common electrodes 34 are arranged between the second substrate 12 and the first substrate 10.

A wiring pattern 38 is formed on the second substrate 12. In an example of FIG. 1, the wiring pattern 38 is arranged on a surface of the second substrate 12 opposite to the liquid crystal material 14. As illustrated in FIG. 2, the wiring pattern 38 extends in a longitudinal direction Dlong (long side direction) of the rectangular second substrate 12. The plurality of common electrodes 34 extends in the lateral direction Dlat (short side direction of the rectangular first substrate 10), and the respective common electrodes 34 are arrayed in the longitudinal direction Dlong (long side direction of the rectangular first substrate 10). The presence or absence of a touch is detected according to a difference in a capacitance due to the presence or absence of a material which blocks an electric field formed between the wiring pattern 38 and the common electrodes 34.

In detail, respective different voltages are applied to the wiring pattern 38 and the common electrodes 34 to develop an electric field (fringe electric field) between the wiring pattern 38 and the common electrodes 34 (in detail, to outside of a counter area). The presence or absence of a touch is detected according to a difference in a capacitance due to the presence or absence of the material (for example, a finger 40) which blocks the electric field formed between the wiring pattern 38 and the common electrodes 34. That is, a touch panel 42 (refer to FIG. 1) is configured by the second substrate 12, the wiring pattern 38, and the common electrodes 34. A front panel 46 is stuck onto a touch panel 42 through an adhesive layer 44 for reinforcement.

According to this embodiment, since the touch panel 42 is incorporated into the device, the device can be made thinner than the related art device. Also, since the liquid crystal display panel 36 and the touch panel 42 share the second substrate 12, a countermeasure against the overlapping displacement between the liquid crystal display panel 36 and the touch panel 42 is not required.

Figure 3:
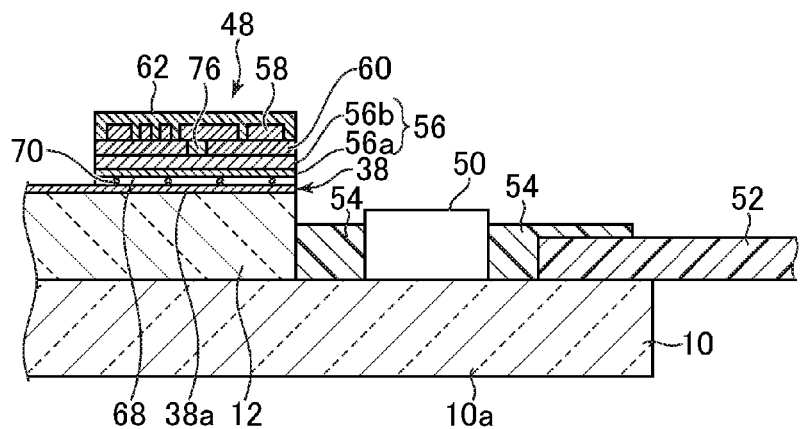
FIG. 3 is a cross-sectional view illustrating ends of a first substrate and a second substrate.

FIG. 3 is a cross-sectional view illustrating ends of the first substrate 10 and the second substrate 12. The first substrate 10 is arranged to have a projecting portion 10a projected from the second substrate 12. The projecting portion 10a of the first substrate 10 and the second substrate 12 are stepped to forma lower plane (a surface of the projecting portion 10a of the first substrate 10) and a higher plane (a surface of the second substrate 12). An integrated circuit chip 50 is mounted on the projecting portion 10a of the first substrate 10. The integrated circuit chip 50 has a drive circuit of the liquid crystal material 14 built-in. A protection resin 54 for preventing a stress from being concentrated on an electric connection portion of the integrated circuit chip 50 is disposed to contact an outer periphery of the integrated circuit chip 50. A flexible printed wiring board 52 is attached to the projecting portion 10a of the first substrate 10 for electric connection between the liquid crystal display panel 36 and the external. The resin 54 is mounted on an end of a flexible wiring substrate 48.

As illustrated in FIG. 2, the second substrate 12 has a rectangular planar shape, and a plurality of the wiring patterns 38 extends in a longitudinal direction Dlong along the long side. The wiring pattern 38 of the second substrate 12 has a plurality of terminals 38a (refer to FIGS. 3 and 4). The wiring pattern 38 is made of a transparent conductive material such as ITO (indium tin oxide). The flexible wiring substrate 48 is attached to the second substrate 12 for electric connection of the wiring pattern 38 and the external. The flexible wiring substrate 48 is joined to the second substrate 12 in an overlapping fashion, and electrically connected to the wiring pattern 38.

As illustrated in FIG. 3, the flexible wiring substrate 48 is formed of a multilayer substrate. The flexible wiring substrate 48 includes a first conductive pattern layer 56, a second conductive pattern layer 58, and an insulating layer 60 interposed between the first conductive pattern layer 56 and the second conductive pattern layer 58. The first conductive pattern layer 56 is formed on one surface (lower surface of FIG. 3) of the insulating layer 60, and the second conductive pattern layer 58 is formed on the other surface (upper surface of FIG. 3). The insulating layer 60 is formed of a base film made of a resin. The first conductive pattern layer 56 has a copper foil layer 56b which is an underlying layer with a gold plating layer 56a suitable for electric connection as an uppermost layer (lowermost layer in FIG. 3). The gold plating layer 56a is joined to the terminals 38a of the wiring pattern 38. The second conductive pattern layer 58 is formed of, for example, a copper foil. A protective film 62 is formed on the insulating layer 60 so as to cover the second conductive pattern layer 58.

Figure 4:
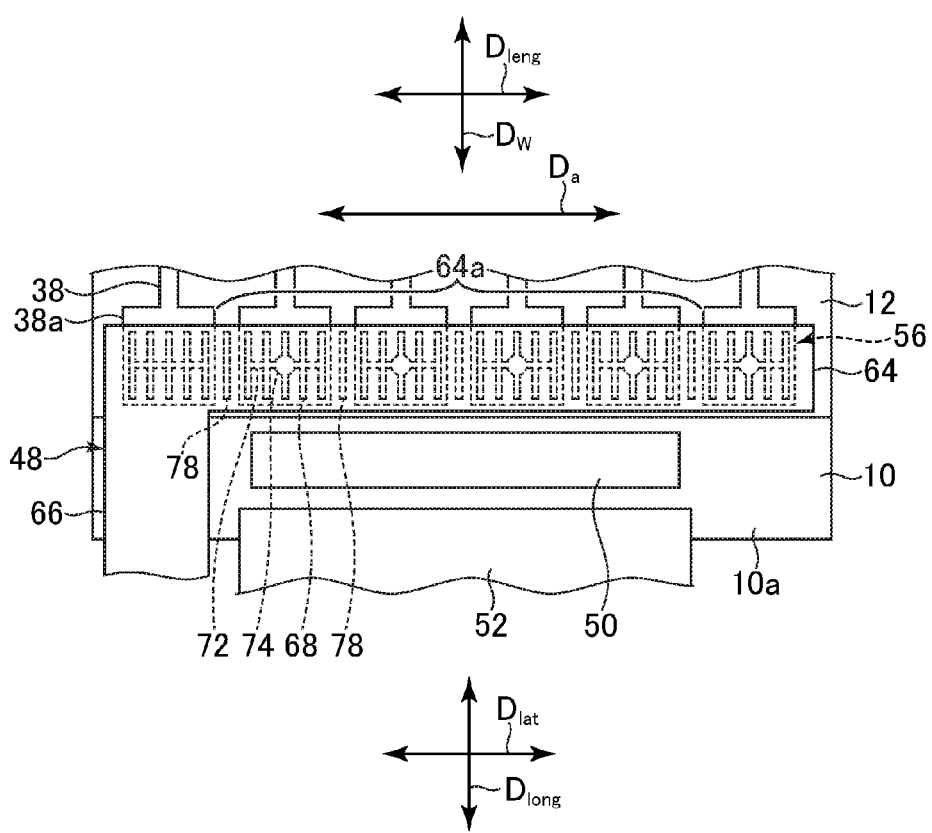
FIG. 4 is a plan view illustrating a planar shape and a connection position of a flexible wiring substrate.
Figure 5:
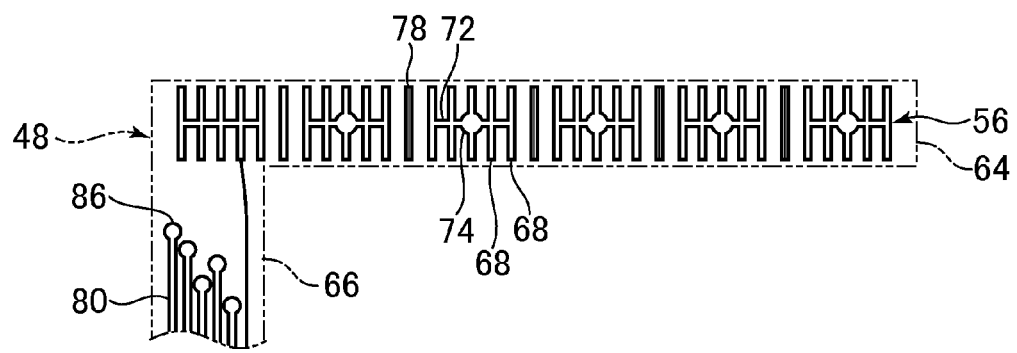
FIG. 5 is a plan view illustrating a first conductive pattern layer of the flexible wiring substrate.
Figure 6:
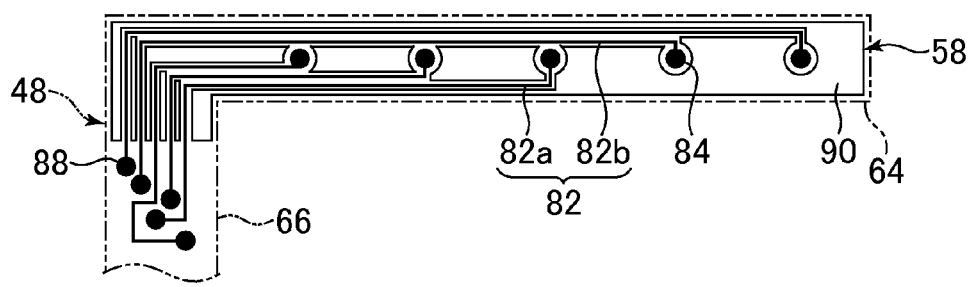
FIG. 6 is a plan view illustrating a second conductive pattern layer of the flexible wiring substrate.

FIG. 4 is a plan view illustrating a planar shape and a connection position of the flexible wiring substrate 48. FIG. 5 is a plan view illustrating the first conductive pattern layer 56 of the flexible wiring substrate 48. FIG. 6 is a plan view illustrating the second conductive pattern layer 58 of the flexible wiring substrate 48.

The flexible wiring substrate 48 includes an overlap portion 64 overlapped with the second substrate 12 (in detail, an end thereof). In the overlap portion 64, the flexible wiring substrate 48 is joined to the second substrate 12, and electrically connected to the wiring pattern 38 (the plurality of terminals 38a) of the second substrate 12. An end of the second substrate 12 which overlaps with the overlap portion 64 is an end on one side (lower side in FIG. 4) in the longitudinal direction Dlong (vertical direction in FIG. 4), which is an end extending in the lateral direction Dlat (horizontal direction in FIG. 4). The length direction (horizontal direction in FIG. 4) of the overlap portion 64 matches the lateral direction Dlat (horizontal direction in FIG. 4) of the second substrate 12. The projecting portion 10a of the first substrate 10 is projected from the end of the second substrate 12 which overlaps with the overlap portion 64 of the flexible wiring substrate 48.

The flexible wiring substrate 48 includes a leading portion 66 led from the overlap portion 64. The leading portion 66 is led to intersect with the length direction Dleng of the overlap portion 64. The leading portion 66 is led from a position avoiding an intermediate portion 64a of the overlap portion 64 in the length direction Dleng (horizontal direction in FIG. 4). The leading portion 66 is led from one of both ends of the overlap portion 64 in the length direction Dleng. The leading portion 66 of the flexible wiring substrate 48 does not cover the overall projecting portion 10a of the first substrate 10. That is, the leading portion 66 is led to overlap with a part of the projecting portion 10a, but avoid the overlapping with another portion. The leading portion 66 is arranged not to overlap with the integrated circuit chip 50 mounted on the projecting portion 10a of the first substrate 10. In other word, the flexible wiring substrate 48 is not projected from the second substrate 12 in the direction of the integrated circuit chip 50. That is, the flexible wiring substrate 48 has the leading portion 66 so as to be projected from the second substrate 12. The leading portion 66 is led from the overlap portion 64 with the avoidance of a position adjacent to the integrated circuit chip 50 of the overlap portion 64.

The first conductive pattern layer 56 includes a plurality of terminal portions 68. The plurality of terminal portions 68 is electrically connected to overlap with the wiring pattern 38 (the plurality of terminals 38a). The terminal portions 68 are shaped to extend in the width direction Dw (vertical direction in FIG. 4 or 5) intersecting with the length of the overlap portion 64. The plurality of terminal portions 68 is divided into a plurality of groups. The terminal portions 68 in each of the groups are configured by adjacent two or more (in the example of FIG. 4, three or more) terminal portions 68. The adjacent two or more terminal portions 68 configuring each of the groups are electrically connected to one of the terminals 38a in the wiring pattern 38 of the second substrate 12 (refer to FIG. 4). In detail, as illustrated in FIG. 3, the terminal portions 68 and the terminals 38a are electrically connected to each other through an anisotropic conductive material (for example, an anisotropic conductive film) 70.

The adjacent two or more terminal portions 68 configuring each of the groups are electrically connected to each other by a connection portion 72. The connection portion 72 is also a part of the first conductive pattern layer 56. The connection portion 72 is shaped to extend in the length direction Dleng (horizontal direction in FIG. 4) of the overlap portion 64. The adjacent two or more terminal portions 68 configuring each of the groups, and the connection portion 72 are shaped to intersect with each other with shared intersection portions. A direction along which the terminal portions 68 extend and a direction along which the connection portion 72 extends intersect with each other. The connection portion 72 is located in the center of the overlap portion 64 in the width direction Dw (vertical direction in FIG. 5). Therefore, since a binder (resin) before curing, of the anisotropic conductive material 70 (refer to FIG. 3) flows in both directions of the width of the overlap portion 64, even if the connection portion 72 avoids a flow of the binder of the anisotropic conductive material 70, its influence is small.

The adjacent two or more terminal portions 68 configuring each of the groups have a first land portion 74 at an intersection between one terminal portion 68 and the connection portion 72. The first land portions 74 are disposed on the terminal portions 68 at positions except for both ends of the three or more terminal portions 68 in an arrangement direction Da. A contact portion 76 (refer to FIG. 3) is disposed on the first land portion 74. The contact portion 76 is disposed to penetrate through the insulating layer 60 (refer to FIG. 3). The contact portion 76 is made of a conductive material such as metal. The first land portion 74 is electrically connected to the second conductive pattern layer 58 by the contact portion 76. Also, the contact portion 76 is located to overlap with the terminals 38a of the wiring pattern 38 on the second substrate 12.

The first conductive pattern layer 56 includes dummy terminals 78. The dummy terminals 78 are arranged between the terminal portions 68 of the adjacent groups. Each of the dummy terminals 78 breaks electrical continuity with the connection portion 72. With the provision of the dummy terminals 78 in an area where the terminal portions 68 are not arranged, roughness caused by the presence or absence of the terminal portions 68 can be reduced. As illustrated in FIG. 5, the first conductive pattern layer 56 includes a plurality of first wires 80 separated from the plurality of terminal portions 68, and arranged in the leading portion 66. The first wires 80 each have an external terminal not shown.

As illustrated in FIG. 6, the second conductive pattern layer 58 includes a plurality of second wires 82 electrically connected to the respective plural contact portions 76 (refer to FIG. 3). In detail, the second wires 82 each include a second land portion 84 that overlaps with the contact portion 76. The second wires 82 are formed to pass through the overlap portion 64 of the flexible wiring substrate 48. The plurality of second wires 82 includes a wire 82a that passes through a side end of a side (lower side in FIG. 6) at which the leading portion 66 is led from the plurality of contact portions 76, and a wire 82b that passes through a side end opposite (upper side in FIG. 6) to the side at which the leading portion 66 is led in the overlapping portion 64.

The second wires 82 are electrically connected to the plurality of first wires 80 on the first conductive pattern layer 56 illustrated in FIG. 5 in the leading portion 66. The first wires 80 each have a first pad 86, and the second wires 82 each have a second pad 88. The first pads 86 and the second pads 88 are located to overlap with each other, and are electrically connected to each other through a conductive material (not shown) that penetrates through the insulating layer 60.

The second conductive pattern layer 58 has a planar pattern 90 formed to avoid a contact with the plurality of second wires 82. The planar pattern 90 may be connected to GND. With the provision of the planar pattern 90, roughness caused by the presence or absence of the second wires 82 can be reduced.

According to this embodiment, the flexible wiring substrate 48 includes the plurality of contact portions 76 that penetrates through the insulating layer 60, and electrically connects the respective plural terminal portions 68 to the second conductive pattern layer 58. The plurality of contact portions 76 is arranged to overlap with the plurality of terminal portions 68. Therefore, the width of the flexible wiring substrate 48 can be narrowed. An outer diameter of the respective contact portions 76 is larger than the widths of the terminal portions 68 and the connection portion 72.

Modified Example 1

Figure 7:
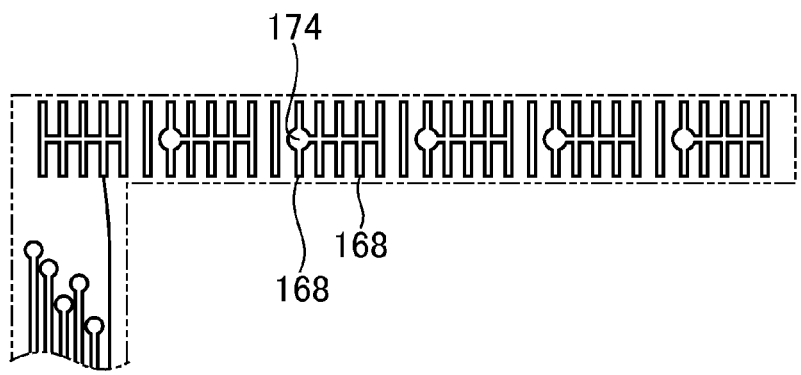
FIG. 7 is a diagram illustrating a modified example 1 of the flexible wiring substrate.

FIG. 7 is a diagram illustrating a modified example 1 of the flexible wiring substrate. This example is identical with the above embodiment (FIG. 5) in that terminal portions 168 in each of the groups include three or more terminal portions 168. However, this example is different from the above embodiment in that each of first land portions 174 is disposed on the terminal portion 168 located on any one of both ends in an array direction of the three or more terminal portions 168.

Modified Example 2

Figure 8:
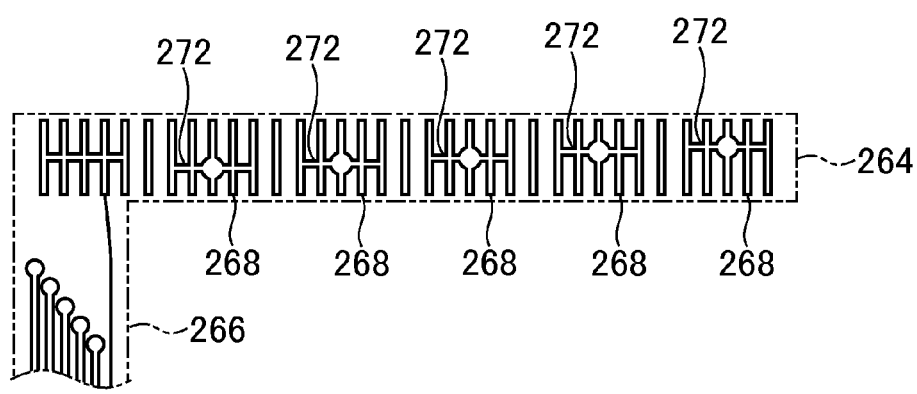
FIG. 8 is a diagram illustrating a first conductive pattern according to a modified example 2 of the flexible wiring substrate.
Figure 9:
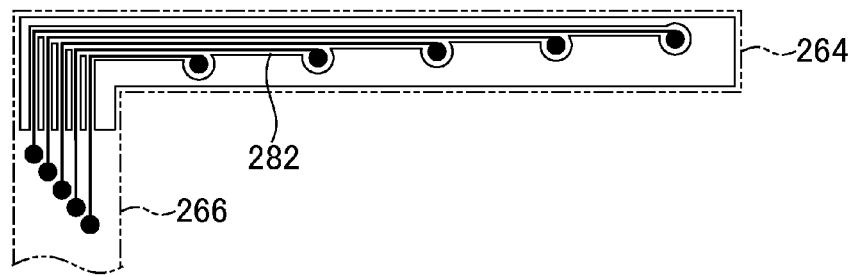
FIG. 9 is a diagram illustrating a second conductive pattern according to the modified example 2 of the flexible wiring substrate.

FIG. 8 is a diagram illustrating a first conductive pattern according to a modified example 2 of the flexible wiring substrate. FIG. 9 is a diagram illustrating a second conductive pattern according to the modified example 2 of the flexible wiring substrate.

As illustrated in FIG. 8, a plurality of connection portions 272 which is electrically connected to terminal portions 268 in the plurality of groups is located to be displaced from one side to the other side (for example, top to bottom) of an overlap portion 264 in the array order in the width direction, in the array order (for example, from right to left in FIG. 8) of the terminal portions 268 in the plurality of groups.

As illustrated in FIG. 9, a plurality of second wires 282 passes through a side end opposite to a side from which a leading portion 266 is led, with the avoidance of the side from which the leading portion 266 is led, from the plurality of contact portions 76 (refer to FIG. 3), in the overlap portion 264.

According to the above configuration, a sequence of the array of the terminal portions 268 in the plurality of groups corresponds to a sequence of the array of the plurality of second wires 282. For example, the second wires 282 electrically connected to the terminal portions 268 in an n (n≥1)-th group from the right in FIG. 8 are located at an n-th wire from the left in the leading portion 266.

Modified Example 3

Figure 10:
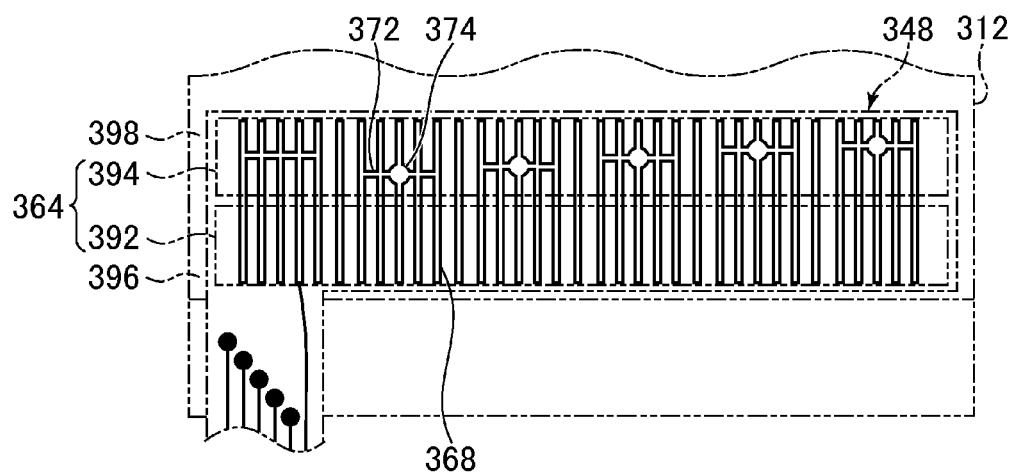
FIG. 10 is a diagram illustrating a first conductive pattern according to a modified example 3 of the flexible wiring substrate.
Figure 11:
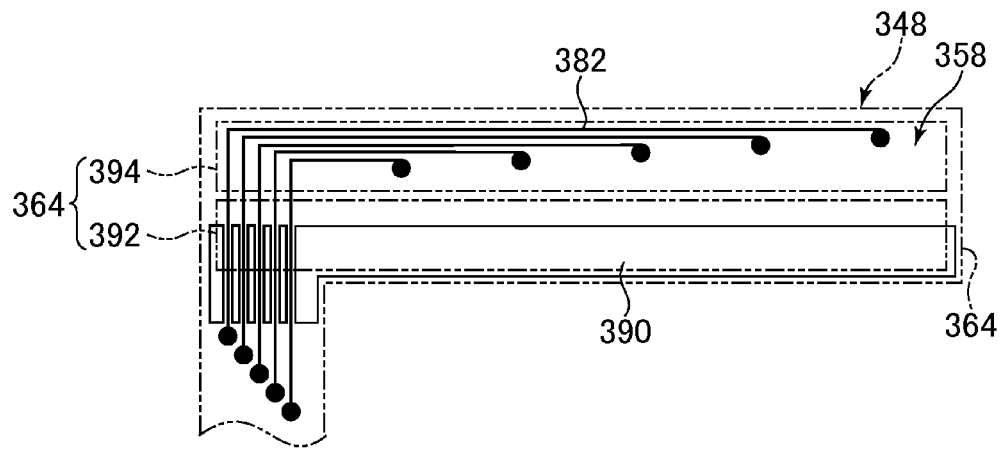
FIG. 11 is a diagram illustrating a second conductive pattern according to the modified example 3 of the flexible wiring substrate.

FIG. 10 is a diagram illustrating a first conductive pattern according to a modified example 3 of the flexible wiring substrate. FIG. 11 is a diagram illustrating a second conductive pattern according to the modified example 3 of the flexible wiring substrate.

The above-mentioned flexible wiring substrate 48 illustrated in FIG. 3 is joined to the second substrate 12 by crimping with the use of the anisotropic conductive material 70. For crimping, a heat and a pressure are applied to the anisotropic conductive material 70. The overall overlap portion 64 of the flexible wiring substrate 48 is a crimped portion.

In this modified example, an overlap portion 364 of a flexible wiring substrate 348 has a crimped portion 392 joined to a second substrate 312 by crimping, and an uncrimped portion 394 overlapped with the second substrate 312 with the avoidance of the crimping.

As illustrated in FIG. 10, a plurality of connection portions 372 electrically connected to respective terminal portions 368 in a plurality of groups are all displaced on any side (upper side in FIG. 10) from the center of the overlap portion 364 in the width direction.

A first land portion 374 located at an intersection point between one terminal portion 368 and the connection portion 372 is arranged in the uncrimped portion 394. The contact portion 76 (refer to FIG. 3) overlaps with the first land portion 374. That is, the plurality of contact portions 76 (refer to FIG. 3) is arranged in the uncrimped portion 394. According to this configuration, when a heat and a pressure are applied to the anisotropic conductive material 70, no pressure is applied to the contact portions 76, and a temperature of the heat applied to the contact portions 76 is also decreased.

As illustrated in FIG. 10, an end of the second substrate 312, which is joined to the flexible wiring substrate 348, includes an outward portion 396 on a leading end side in the longitudinal direction, and an inward portion 398 on the center side of the second substrate 312 from the leading end. A crimped portion 392 is joined to the outward portion 396. The uncrimped portion 394 overlaps with the inward portion 398.

As illustrated in FIG. 11, a second conductive pattern layer 358 has a planar pattern 390 formed to avoid a contact with a plurality of second wires 382. The planar pattern 390 is formed to overlap with the crimped portion 392 with the avoidance of the overlap with the uncrimped portion 394. That is, since no planar pattern 390 is arranged in the uncrimped portion 394, when a heat and a pressure are applied to an anisotropic conductive material 370, the amount of heat escaped from the planar pattern 390 can be reduced.

Modified Example 4

Figure 12:
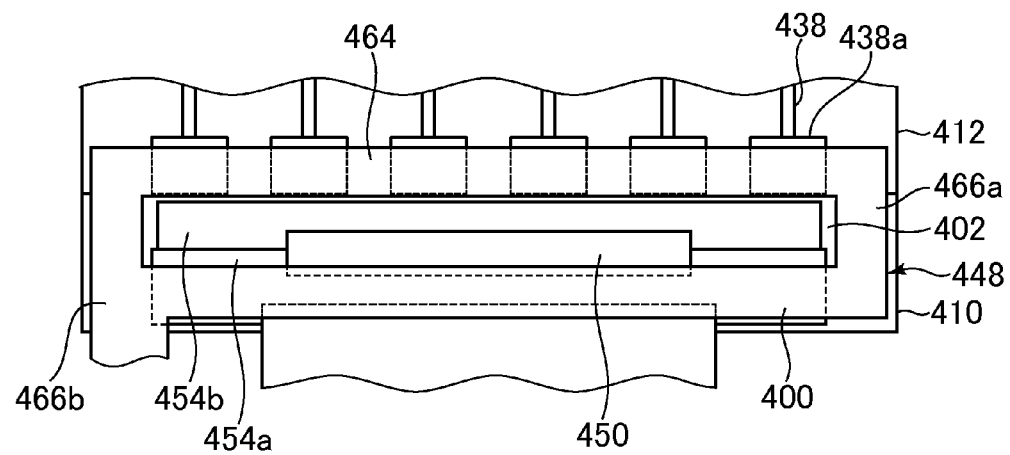
FIG. 12 is a plan view illustrating a liquid crystal display device equipped with a built-in touch panel according to a modified example 4.
Figure 13:
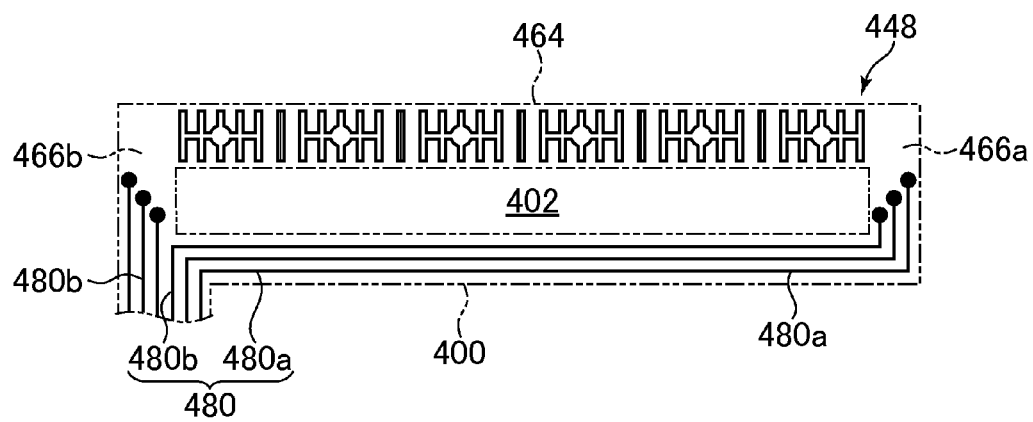
FIG. 13 is a diagram illustrating a first conductive pattern of a flexible wiring substrate according to the modified example 4.
Figure 14:
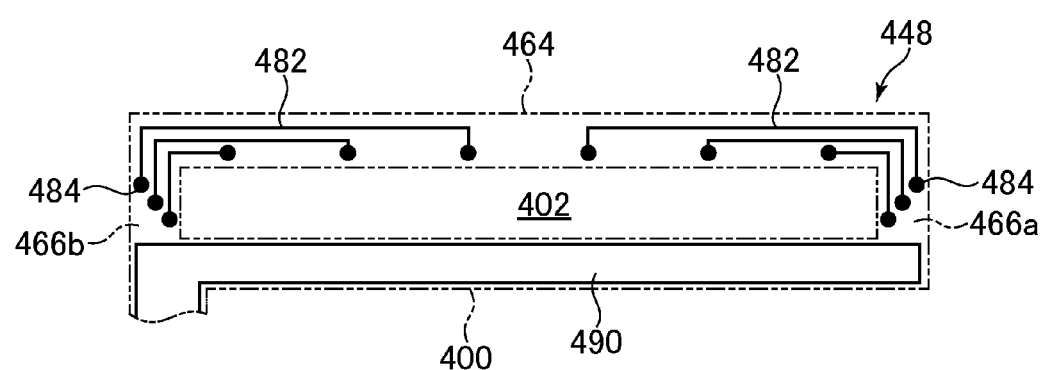
FIG. 14 is a diagram illustrating a second conductive pattern of the flexible wiring substrate according to the modified example 4.

FIG. 12 is a plan view illustrating a liquid crystal display device equipped with a built-in touch panel according to a modified example 4. FIG. 13 is a diagram illustrating a first conductive pattern of a flexible wiring substrate according to the modified example 4. FIG. 14 is a diagram illustrating a second conductive pattern of the flexible wiring substrate according to the modified example 4.

In this example, respective leading portions 466a and 466b of a flexible wiring substrate 448 are led from both ends of an overlap portion 464 in the length direction. The flexible wiring substrate 448 has a coupling portion 400 that couples the leading portions 466a and 466b led from both ends of the overlap portion 464 with each other with being spaced from the overlap portion 464. A space 402 is formed between the overlap portion 464 and the coupling portion 400.

On the other hand, the other leading portion 466b is longer than one leading portion 466a. In detail, the coupling portion 400 extends from an end of one leading portion 466a, and the other leading portion 466b further extends beyond the coupling portion 400. A plurality of first wires 480 includes two or more first wires 480a formed to arrive at the other leading portion 466b from one leading portion 466a through the coupling portion 400, and two or more first wires 480b formed on the other leading portion 466b.

A plurality of second wires 482 is divided into a pair of groups extending from a second land portion 484 in directions opposite to each other in the length direction (horizontal direction in FIG. 14) of the overlap portion 464. The second wires 482 in one group are electrically connected to two or more first wires 480a in one leading portion 466a, and the second wires 482 in the other group are electrically connected to two or more first wires 480b in the other leading portion 466b. A planar pattern 490 is formed in the coupling portion 400. The planar pattern 490 is formed in the leading portion 466b so as to arrive at a position beyond the coupling portion.

In this modified example, as illustrated in FIG. 12, before the flexible wiring substrate 448 is attached to a second substrate 412, a resin 454a for protecting an integrated circuit chip 450 is disposed on a first substrate 410. In this case, the resin 454a is disposed only at a position distant from a wiring pattern 438 so that the resin 454a does not adhere to a terminal 438a of the wiring pattern 438 on the second substrate 412. For example, the resin 454a is disposed on the first substrate 410 with the avoidance of an area closer to the terminal 438a than the integrated circuit chip 450.

Then, the flexible wiring substrate 448 is attached to the second substrate 412. Since the resin 454a does not adhere to the terminal 438a, an excellent electric connection is enabled. Thereafter, the space 402 formed between an overlap portion 464 of the flexible wiring substrate 448 and the coupling portion 400 is further filled with a resin 454b to further protect the integrated circuit chip 450. In detail, in the above-mentioned filling of the resin 454b, the resin 454b is disposed in an area (area close to the terminal 438a) in which the resin 454a is not provided.

According to this modified example, since the resin 454b is disposed in an area closer to the terminal 438a after the flexible wiring substrate 448 has been attached to the second substrate 412, there arises no problem that the resin 454b adheres to the terminal 438a to prevent the electric connection.

Modified Example 5

Figure 15:
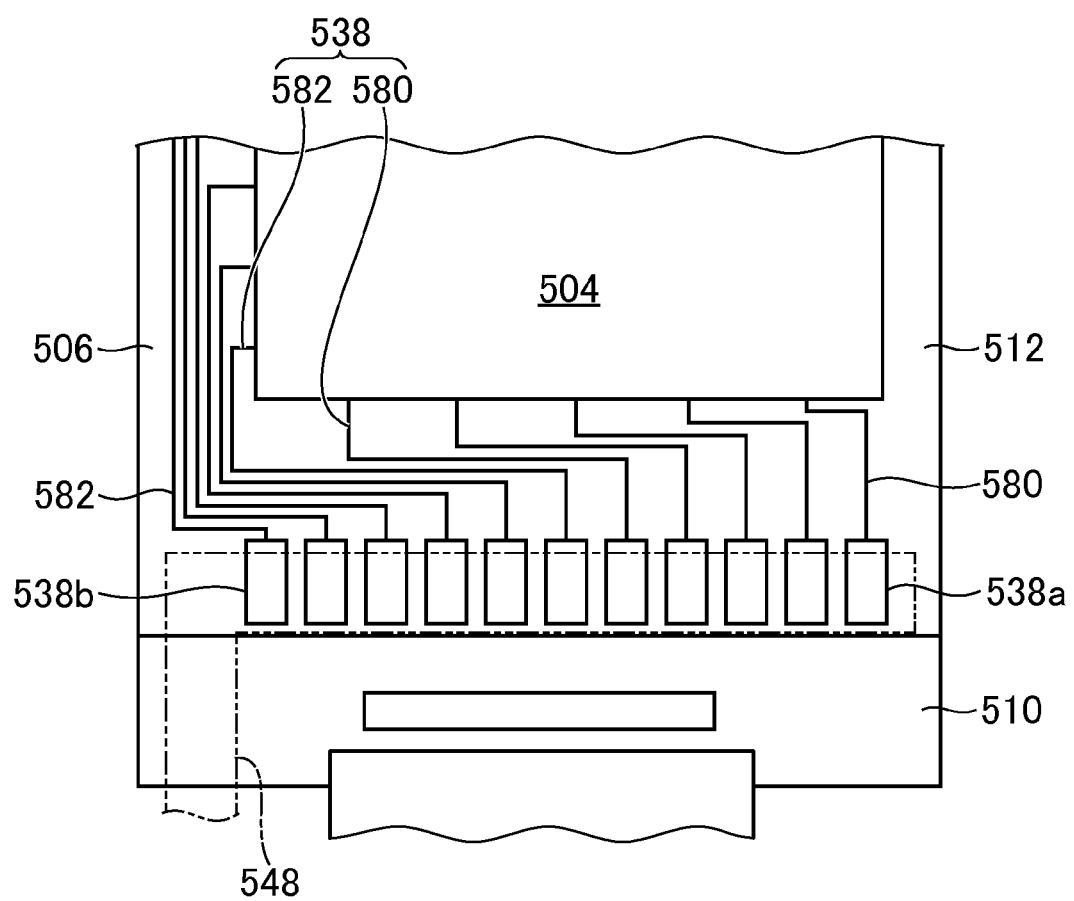
FIG. 15 is a plan view illustrating a liquid crystal display device equipped with a built-in touch panel according to a modified example 5.

FIG. 15 is a plan view illustrating a liquid crystal display device equipped with a built-in touch panel according to a modified example 5. In this example, a wiring pattern 538 formed on a second substrate 512 includes a plurality of first wires 580, and a plurality of second wires 582. The first wires 580 are led from an image display area 504 in a longitudinal direction (vertical direction in FIG. 15) of the second substrate 512, and each have a first terminal 538a on an end thereof. The second wires 582 are led from the image display area 504 in a lateral direction (horizontal direction in FIG. 15) of the second substrate 512, bent in a peripheral edge area 506 called "frame" located outside of the image display area 504, and led in the longitudinal direction (vertical direction in FIG. 15) of the second substrate 512, and each have a second terminal 538b on an end thereof. A flexible wiring substrate 548 is electrically connected to the first wires 580 and the second wires 582.

Figure 16:
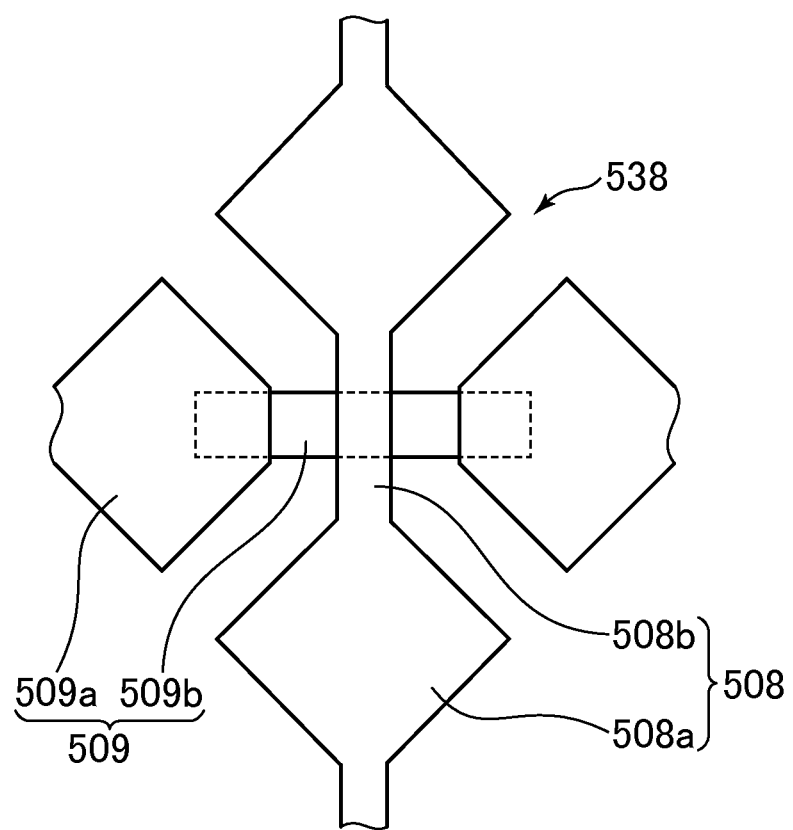
FIG. 16 is an enlarged view of a portion inside of an image display area of a wiring pattern according to the modified example 5.

FIG. 16 is an enlarged view of a portion inside of the image display area 504 of the wiring pattern 538. The wiring pattern 538 includes a plurality of first electrodes 508 and a plurality of second electrodes 509, inside of the image display area 504. The first electrodes 508 are connected with the first wires 580, and the second electrodes 509 are connected with the second wires 582.

The first electrodes 508 include first wide portions 508a, and a first line portion 508b thinner than the first wide portion 508a. The first wide portions 508a are located with a space therebetween, and the adjacent first wide portions 508a are connected to each other by the first line portion 508b.

The second electrodes 509 include second wide portions 509a, and a second line portion 509b thinner than the second wide portion 509a. The second wide portions 509a are located with a space therebetween, and the adjacent second wide portions 509a are connected to each other by the second line portion 509b. The second line portion 509b is designed to sterically intersect with the first line portion 508b through an insulator not shown.

In the above-mentioned embodiment (FIG. 2), respective different voltages are applied to the wiring pattern 38 and the common electrodes 34 to detect the presence or absence of a touch with the use of an electric field developed between the wiring pattern 38 and the common electrodes 34. The common electrodes 34 are formed on the first substrate 10, and the wiring pattern 38 is formed on the second substrate 12.

On the contrary, in this embodiment, the presence or absence of the touch is detected with the use of the electric field developed between the first electrodes 508 and the second electrodes 509 of the wiring pattern 538. The first electrodes 508 and the second electrodes 509 are each formed on the second substrate 512.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device equipped with a built-in touch panel, comprising:
   a first substrate on which a circuit layer for driving a liquid crystal material is formed;
   a second substrate on which a wiring pattern for configuring a touch panel is formed; and
   a flexible wiring substrate joined to have a portion overlapped with the second substrate, and electrically connected to the wiring pattern,
   wherein the flexible wiring substrate is formed of a multilayer substrate having a first conductive pattern layer having a plurality of terminal portions overlapping with and electrically connected onto the wiring pattern, a second conductive pattern layer, an insulating layer interposed between the first conductive pattern layer and the second conductive pattern layer, and a plurality of contact portions that penetrates through the insulating layer and electrically connects the plurality of terminal portions to the second conductive pattern layer,
   wherein the plurality of contact portions are arranged to overlap with the plurality of terminal portions and the wiring pattern,
   wherein the flexible wiring substrate includes an overlap portion overlapped with the second substrate, and a leading portion that protrudes from at least one of both ends of the overlap portion orthogonal to a length direction of the overlap portion with the avoidance of an intermediate portion thereof,
   wherein the overlap portion overlaps in the length direction with one side of the second substrate oriented in a longitudinal direction orthogonal to the length direction, wherein the one side is extended in a lateral direction,
   wherein the length direction of the overlap portion and the lateral direction of the one side match each other,
   wherein the plurality of terminal portions are configured as a plurality of groups each having two or more adjacent terminal portions,
   wherein the first conductive pattern layer has connection portions that electrically connect the two or more adjacent terminal portions in each group of the plurality of groups,
   wherein the plurality of terminal portions are each shaped to extend greater in a width direction orthogonal to the length of the overlap portion than in other directions,
   wherein the connection portion is shaped to extend in the length direction of the overlap portion,
   wherein the adjacent two or more terminal portions configuring each of the groups, and the connection portion are shaped to intersect with each other with shared intersection portions, and
   wherein the two or more adjacent terminal portions in each group of the plurality of groups have a land portion at an intersection point between one of the terminal portions and the connection portion, and are electrically connected to the second conductive pattern layer by one of the contact portions disposed on the land portion.

2. The liquid crystal display device equipped with a built-in touch panel according to claim 1,
   wherein the leading portion protrudes from one of the both ends of the overlap portion in the length direction thereof.

3. The liquid crystal display device equipped with a built-in touch panel according to claim 1,
   wherein the leading portion protrudes from each of the both ends of the overlap portion in the length direction, and
   wherein the flexible wiring substrate further includes a coupling portion that couples the leading portions protruding from the both ends of the overlap portion with being spaced from the overlap portion, and a space is formed between the overlap portion and the coupling portion.

4. The liquid crystal display device equipped with a built-in touch panel according to claim 1,
   wherein the first conductive pattern layer includes a dummy terminal that does not establish electrical continuity with the connection portion between the terminal portions of adjacent groups.

5. The liquid crystal display device equipped with a built-in touch panel according to claim 1,
   wherein the connection portion is located in a center of the overlap portion in the width direction.

6. The liquid crystal display device equipped with a built-in touch panel according to claim 1,
   wherein a plurality of the connection portions electrically connected to the respective terminal portions of the plurality of groups are displaced from one side of both sides of the overlap portion in the width direction to an other side of the both sides in an arrangement sequence of the terminal portions of the plurality of groups.

7. The liquid crystal display device equipped with a built-in touch panel according to claim 6,
   wherein the plurality of connection portions electrically connected to the respective terminal portions of the plurality of groups are located at positions displaced from a center of the overlap portion in the width direction to either side of the both sides of the overlap portion in the width direction.

8. The liquid crystal display device equipped with a built-in touch panel according to claim 1,
   wherein each group of the plurality of groups includes three or more terminal portions, and wherein the land portion is disposed on a terminal portion except for both endmost terminal portions in an arrangement direction of three or more terminal portions.

9. The liquid crystal display device equipped with a built-in touch panel according to claim 1,
wherein each group of the plurality of groups includes three or more terminal portions, and
wherein the land portion is disposed on an endmost terminal portion in an arrangement direction of the three or more terminal portions.

10. The liquid crystal display device equipped with a built-in touch panel according to claim 1,
wherein an outer diameter of the respective contact portions is larger than widths of the terminal portions and the connection portion.

11. The liquid crystal display device equipped with a built-in touch panel according to claim 1,
wherein the overlap portion of the flexible wiring substrate includes a crimped portion joined to the second substrate by crimping, and an uncrimped portion overlapped with the second substrate with the avoidance of crimping, and
wherein the plurality of the contact portions are arranged in the uncrimped portion.

12. The liquid crystal display device equipped with a built-in touch panel according to claim 11,
wherein the end of the second substrate joined to the flexible wiring substrate includes an outward portion of a leading end side in the longitudinal direction, and an inward portion on a center side of the second substrate from the leading end, and
wherein the crimped portion is joined to the outward portion and,
wherein the uncrimped portion is overlapped with the inward portion.

13. The liquid crystal display device equipped with a built-in touch panel according to claim 12,
wherein the second conductive pattern layer has a planar pattern formed to avoid a contact with the plurality of second wires, and
wherein the planar pattern is formed to overlap with the crimped portion with the avoidance of overlapping with the uncrimped portion.

14. The liquid crystal display device equipped with a built-in touch panel according to claim 1,
wherein the first conductive pattern layer includes a plurality of first wires separated from the plurality of terminal portions and arranged in the leading portion,
wherein the second conductive pattern layer includes a plurality of second wires electrically connected to the plurality of contact portions, respectively, and
wherein the plurality of second wires of the second conductive pattern layer passes through the overlap portion of the flexible wiring substrate, and is electrically connected to the plurality of first wires of the first conductive pattern layer on the leading portion.

15. The liquid crystal display device equipped with a built-in touch panel according to claim 14,
wherein the plurality of second wires includes a wire that passes through a side end at which the leading portion protrudes from the plurality of contact portions, and a wire that passes through a side end opposite to the side at which the leading portion protrudes in the overlap portion.

16. The liquid crystal display device equipped with a built-in touch panel according to claim 14,
wherein the plurality of second wires passes through a side end opposite to a side at which the leading portion protrudes with the avoidance of the side at which the leading portion protrudes from the plurality of contact portions in the overlap portion.

17. The liquid crystal display device equipped with a built-in touch panel according to claim 14,
wherein the second conductive pattern layer has a planar pattern formed to avoid a contact with the plurality of second wires.

18. The liquid crystal display device equipped with a built-in touch panel according to claim 1,
wherein the wiring pattern of the second substrate has a plurality of terminals, and,
wherein the adjacent two or more terminal portions configuring each of the groups electrically connected by the connection portion are electrically connected to one of the terminals of the wiring pattern of the second substrate.

19. The liquid crystal display device equipped with a built-in touch panel according to claim 1,
wherein the first substrate is arranged to have a projecting portion projected from the second substrate, and
wherein the projecting portion of the first substrate is projected from the end of the second substrate which overlaps with the overlap portion of the flexible wiring substrate.

20. The liquid crystal display device equipped with a built-in touch panel according to claim 19,
wherein the leading portion of the flexible wiring substrate protrudes to avoid an overlap with a part of the projecting portion of the first substrate.

21. The liquid crystal display device equipped with a built-in touch panel according to claim 20, further comprising:
an integrated circuit chip mounted in an area of the projecting portion of the first substrate which does not overlap with the leading portion of the flexible wiring substrate; and
a resin disposed to come in contact with an outer periphery of the integrated circuit chip.

* * * * *